(12) United States Patent
Jayathirtha et al.

(10) Patent No.: US 10,023,324 B2
(45) Date of Patent: Jul. 17, 2018

(54) METHODS AND APPARATUS FOR PROVIDING REAL-TIME FLIGHT SAFETY ADVISORY DATA AND ANALYTICS

(71) Applicant: HONEYWELL INTERNATIONAL INC., Morris Plains, NJ (US)

(72) Inventors: Srihari Jayathirtha, Karnataka (IN); Amit Nishikant Kawalkar, Karnataka (IN); Kalimulla Khan, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 97 days.

(21) Appl. No.: 15/091,640

(22) Filed: Apr. 6, 2016

(65) Prior Publication Data

US 2017/0291715 A1    Oct. 12, 2017

(51) Int. Cl.
B64D 45/00    (2006.01)

(52) U.S. Cl.
CPC ...... *B64D 45/00* (2013.01); *B64D 2045/0085* (2013.01)

(58) Field of Classification Search
CPC .................. B64D 45/00; B64D 2045/0085
See application file for complete search history.

(56) References Cited

U.S. PATENT DOCUMENTS

| | | | |
|---|---|---|---|
| 4,949,267 A | 8/1990 | Gerstenfeld et al. | |
| 6,609,036 B1 | 8/2003 | Bickford | |
| 6,628,995 B1* | 9/2003 | Korson | G01D 9/005 |
| | | | 244/3.21 |
| 8,665,121 B2 | 3/2014 | Shavit | |
| 8,957,790 B2 | 2/2015 | Cornell et al. | |
| 9,174,725 B2 | 11/2015 | Porez et al. | |
| 2008/0147264 A1* | 6/2008 | Doulatshahi | G06Q 10/06 |
| | | | 701/29.5 |
| 2010/0066565 A1* | 3/2010 | Francois | G06F 9/4881 |
| | | | 340/963 |
| 2010/0161157 A1* | 6/2010 | Guilley | G05B 23/0272 |
| | | | 701/3 |
| 2012/0283897 A1* | 11/2012 | Barraci | G06Q 50/30 |
| | | | 701/3 |

(Continued)

FOREIGN PATENT DOCUMENTS

| | | |
|---|---|---|
| EP | 2521087 A1 | 11/2012 |
| FR | 2980616 A1 | 3/2013 |
| WO | 2014093670 A1 | 6/2014 |

OTHER PUBLICATIONS

Extended EP Search Report for Application No. 17158260.4-1802 dated Aug. 2, 2017.

(Continued)

*Primary Examiner* — Khoi H Tran
*Assistant Examiner* — Robert T Nguyen
(74) *Attorney, Agent, or Firm* — Lorenz & Kopf, LLP

(57) ABSTRACT

A method for analyzing data onboard an aircraft is provided. The method obtains aircraft parameter data; identifies a current phase of flight; determines standard operating procedure (SOP) compliance onboard the aircraft, based on the aircraft parameter data and the current phase of flight; identifies relevant safety events, based on the aircraft parameter data and the current phase of flight; and presents data associated with the SOP compliance and the relevant safety events.

20 Claims, 6 Drawing Sheets

(56) References Cited

U.S. PATENT DOCUMENTS

| | | | | |
|---|---|---|---|---|
| 2014/0200748 A1* | 7/2014 | Porez | ............... | G05B 15/02 |
| | | | | 701/3 |
| 2014/0343764 A1* | 11/2014 | Sacle | ............... | B64D 45/04 |
| | | | | 701/16 |
| 2014/0365040 A1* | 12/2014 | Srivastav | ............ | G08G 5/0021 |
| | | | | 701/3 |

OTHER PUBLICATIONS

Guidance on the Establishment of a Flight Data Analysis Program (FDAP)—Safety Management Systems (SMS); Civil Aviation Advisory Publication, Aug. 2011.

* cited by examiner

METHODS AND APPARATUS FOR PROVIDING REAL-TIME FLIGHT SAFETY ADVISORY DATA AND ANALYTICS

TECHNICAL FIELD

Embodiments of the subject matter described herein relate generally to presenting advisory information to a flight crew onboard an aircraft. More particularly, embodiments of the subject matter relate to monitoring aircraft onboard systems to analyze compliance with aircraft standard operating procedures and presenting action items for indicating required completion.

BACKGROUND

Quality assurance programs are often used by airlines and individual aircraft operators, in which routine flight data monitoring identifies in-flight events, exceedances of pre-defined limits, deviations from the Standard Operating Procedures (SOPs), and the health and condition of various systems. Current quality assurance practice includes the collection of routine flight operations data from aircraft onboard devices designed for data repository. This data may be obtained via physical (i.e., wired) access or via wireless communication link, and once obtained, may be analyzed to identify problems, critical items, SOP deviations, or the like. However, flight crew members lack real-time access to aircraft parameters, events, and/or SOP deviations that have occurred as part of a current flight. This situation may result in the inability of a flight crew member to act to correct an issue during flight, and/or inaccurate documentation of the events by a flight crew member after the flight.

Accordingly, it is desirable to provide a mechanism for real-time analysis of in-flight compliance and safety information. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for analyzing data onboard an aircraft. The method obtains aircraft parameter data; identifies a current phase of flight; determines standard operating procedure (SOP) compliance onboard the aircraft, based on the aircraft parameter data and the current phase of flight; identifies relevant safety events, based on the aircraft parameter data and the current phase of flight; and presents data associated with the SOP compliance and the relevant safety events.

Some embodiments provide a system for analyzing data onboard an aircraft. The system includes: a system memory element; a local communication device, configured to receive aircraft parameter data from a plurality of aircraft onboard systems; at least one processor, communicatively coupled to the system memory element and the local communication device, the at least one processor configured to: identify a current phase of flight; determine standard operating procedure (SOP) compliance onboard the aircraft, based on the aircraft parameter data and the current phase of flight; identify relevant safety events, based on the aircraft parameter data and the current phase of flight; and present data associated with the SOP compliance and the relevant safety events.

Some embodiments provide a non-transitory, computer-readable medium containing instructions thereon, which, when executed by a processor, perform a method. The method obtains, onboard an aircraft, a set of standard operating procedures (SOPs) applicable to a current phase of flight; generates compliance data based on the set of SOPs and status data for a plurality of systems onboard the aircraft; identifies real-time safety data applicable to the current phase of flight; and presents the compliance data and the real-time safety data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
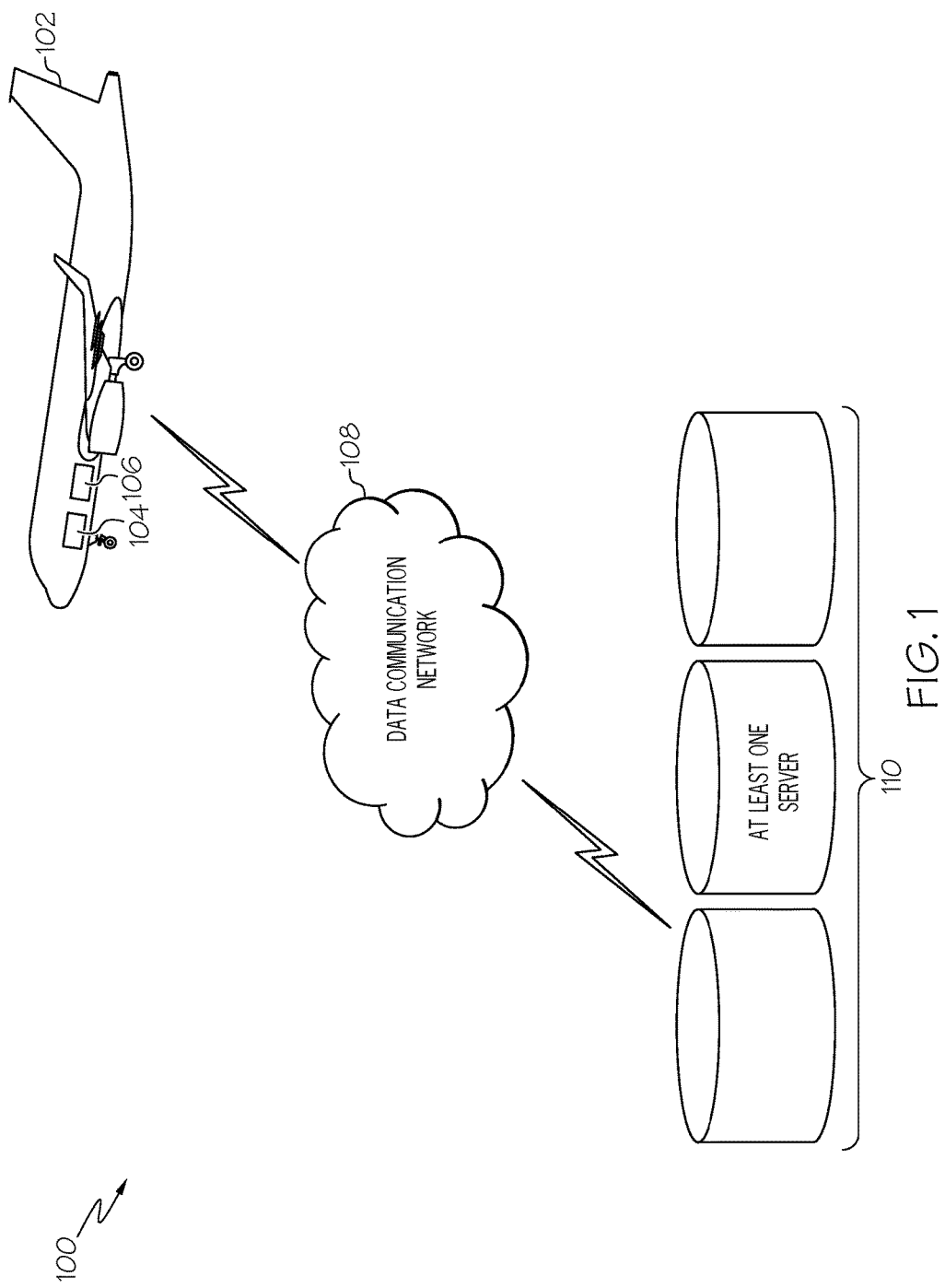
FIG. 1 is a diagram of an aircraft onboard advisory system, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure presents methods and apparatus for determining whether an aircraft is operating safely and within applicable limits, and for presenting real-time advisory data to that effect. Each aircraft or aircraft type is associated with standard operating procedures (SOP) and relevant safety data. A Standard Operating Procedure (SOP) provides a flight crew with a step by step guide to effectively and safely carry out aircraft operations, and safety data includes events and practices stored in a safety database applicable to safe operation of the aircraft. Compliance with applicable SOPs and safety data may include using required settings, limits, and operating thresholds which should not be exceeded for optimal and safe performance of one or more aircraft onboard systems.

The present disclosure describes the use of analytics, or a systematic analysis of flight data against performance limits and SOPs to provide relevant safety alerts and flight data analysis. Determining whether the aircraft is operating within limits, and in compliance with SOPs, includes evaluating the actual performance (i.e., actual flight parameter data) of each aircraft onboard system and detecting compliance with SOPs and safety data associated with operation of an aircraft. In certain embodiments, evaluation of SOPs and relevant safety events is associated with as current phase of flight, and a "next" phase of flight in sequence, and real-time advisories are presented so that a flight crew may prepare for SOPs and safety events applicable to the current phase of flight, the next phase of flight, and potential SOPs and safety events applicable to an entire flight.

Certain terminologies are used with regard to the various embodiments of the present disclosure. A Standard Operating Procedure (SOP) provides a flight crew with a step by step guide to effectively and safely carry out operations. Of note, a checklist is generally carried out as a part of an overall SOP. For example, a particular SOP may include a requirement to conduct the Landing checklist after the landing gear is confirmed down and locked on finals during the approach. An aircraft onboard system includes avionics and other flight systems applicable to operation of an aircraft. A preventive advisory is a notification of SOP non-compliance or a safety event applicable to a current phase of flight, presented using graphical elements on an aircraft onboard display and/or Electronic Flight Bag (EFB) display. In some embodiments, a preventive advisory may include potential SOP non-compliance and/or potential safety events which may occur but which have not yet occurred. Preventive advisories provide information for the flight crew so that SOP non-compliance and safety events may be reported and, when possible, avoided.

Turning now to the figures, FIG. 1 is a diagram of an aircraft onboard advisory system, in accordance with the disclosed embodiments. As shown, an aircraft onboard advisory system 100 generally includes, without limitation, a computing device 104 onboard an aircraft 102 in communication with one or more aircraft onboard systems 106 and at least one server 110. The aircraft 102 may be implemented using any fixed-wing or rotary aircraft, such as an airplane, helicopter, space shuttle, drone, remote pilot vehicle, aircraft simulator, or other aircraft equipped with the capability to provide advisory data applicable to aircraft operations.

The computing device 104 may be implemented using any device which includes at least one processor, some form of computing memory, and input/output (I/O) for transmitting and receiving actual status data and/or parameter data from the aircraft onboard systems 106 and required SOP and/or safety data from the at least one server 110. The computing device 104 may be implemented using a computer system integrated into the aircraft 102 or a personal electronic device. In certain embodiments, the computing device 104 may include the capability of downloading, storing, and executing software applications (i.e., "apps") which include the aircraft onboard advisory functionality described herein. Exemplary embodiments of a computing device 104 may include, without limitation: a laptop computer, a tablet computer, a handheld personal digital assistant, a smartphone, a smartwatch, or other personal electronic device with the capability of communicating with the aircraft onboard systems 106 and the at least one server 110.

The computing device 104 may transmit data to, and receive data from, the aircraft onboard systems 106 and the at least one server 110 via a data communication network 108. The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The aircraft onboard systems 106 may include any system or device onboard the aircraft 102 associated with standard operating procedures (SOPs) and capable of data transmissions reflecting status and/or compliance with the SOPs. Exemplary embodiments of aircraft onboard systems 106 may include communication systems, navigation systems, display systems, flight control systems, or the like.

The at least one server 110 may include any number of application servers, and each server may be implemented using any suitable computer. In some embodiments, the at least one server 110 includes one or more dedicated computers. In some embodiments, the at least one server 110 includes one or more computers carrying out other functionality in addition to server operations. In exemplary embodiments, the at least one server 110 stores at least one database of SOP data and safety data for the aircraft onboard systems 106.

This SOP data and safety data may also be referred to as "rules", within which each aircraft onboard system 106 functions effectively onboard the aircraft. SOP data and safety data may be stored in a standard operating procedure (SOP) database, an airline safety database, a regulatory authority safety database (e.g., a safety database maintained by ICAO, ESEA, FAA, or DGCA of a particular country), or any other database or storage location appropriate to SOPs, safety data, and/or rules. An SOP database may include the "rules", such as a step by step guide to effectively and safely carry out aircraft operations, in addition to aircraft performance limits. Aircraft performance limits may be used to detect events, such as: a maximum speed limit exceedance by aircraft, a landing limit exceedance resulting in overweight landing or hard landing, or the like.

During operation of the aircraft, the aircraft onboard systems 106 perform functions specific to each, and operate within limits specific to a particular flight and/or a particular phase of flight. During flight, and as the aircraft onboard systems 106 operate, the computing device 104 receives actual parameter data from the aircraft onboard systems 106, indicating current performance of the aircraft onboard systems 106. The computing device 104 also receives SOP data and safety data from the at least one server 110. The computing device 104 uses the actual parameter data to determine compliance of the aircraft onboard systems 106 to required limits (i.e., the SOP data and the safety data).

Figure 2:
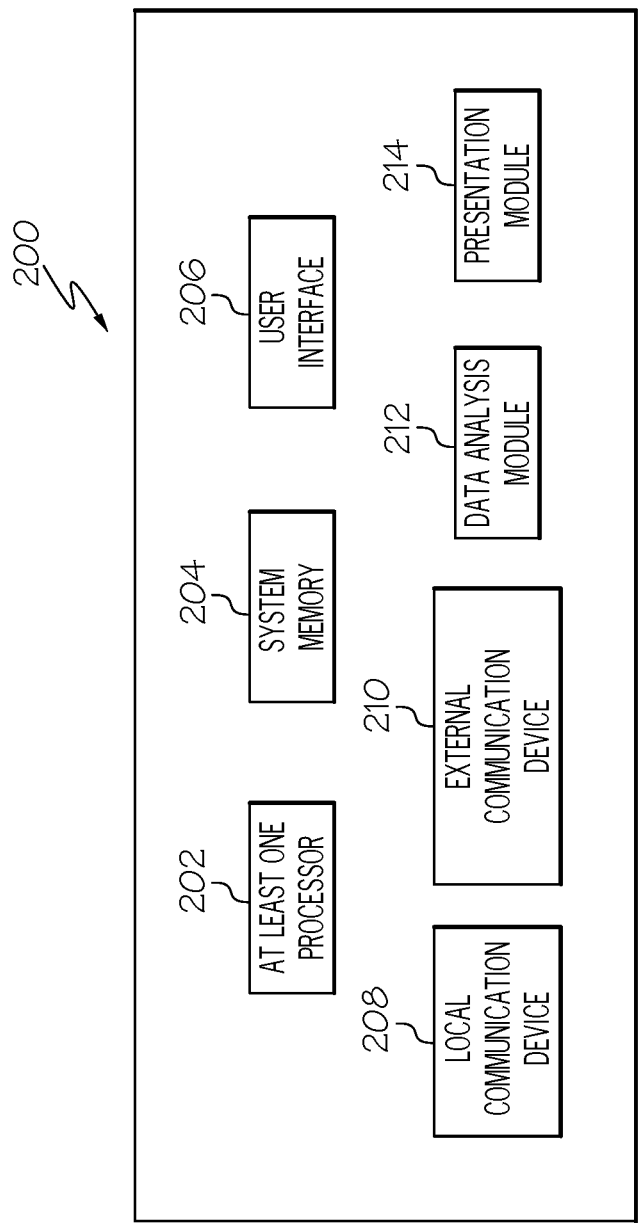
FIG. 2 is a functional block diagram of a computing device suitable for use in an aircraft onboard advisory system, in accordance with the disclosed embodiments.

FIG. 2 is a functional block diagram of a computing device 200 suitable for use in an aircraft onboard advisory system, in accordance with the disclosed embodiments. It should be noted that the computing device 200 can be implemented with the computing device 104 depicted in FIG. 1. In this regard, the computing device 200 shows certain elements and components of the computing device 104 in more detail.

The computing device 200 generally includes, without limitation: at least one processor 202; system memory 204; a user interface 206; a local communication device 208; an external communication device 210; a data analysis module 212; and a presentation module 214. These elements and features of the computing device 200 may be operatively associated with one another, coupled to one another, or otherwise configured to cooperate with one another as needed to support the desired functionality—in particular, providing real-time advisories onboard an aircraft, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the aircraft onboard advisory techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. The system memory 204 may be used to store various databases or other applicable storage structures of SOP data and safety data associated with aircraft onboard systems (as described previously with regard to FIG. 1). SOP data and safety data may include, without limitation: standard operating procedure (SOP) data, airline safety data, a regulatory authority database, or any other data applicable to SOPs and/or rules associated with aircraft onboard systems.

The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to make menu selections for purposes of viewing available advisories indicating SOP and/or safety event compliance or non-compliance of various aircraft onboard systems.

In certain embodiments, the user interface 206 may include or cooperate with various features to allow a user to interact with the computing device 200 via graphical elements rendered on a display element. Accordingly, the user interface 206 may initiate the creation, maintenance, and presentation of a graphical user interface (GUI). In certain embodiments, the display element implements touch-sensitive technology for purposes of interacting with the GUI. Thus, a user can manipulate the GUI by moving a cursor symbol rendered on the display element, or by physically interacting with the display element itself for recognition and interpretation, via the user interface 206. In some embodiments, the user interface 206 may present a GUI as an intuitive and non-distractive display of critical SOP items, which may be used by flight crew members to perform a "quick" review of items to be considered when checklist line items are read. The graphical display of the items may be configured based on predefined priorities and requirements.

In some embodiments, a graphical user interface (presented by the user interface 206) may be configured to display a subset of standard operating procedures (SOPs), which may also be referred to as aircraft rules associated with a particular aircraft. These rules may be applicable to a current phase of flight, the aircraft itself, or both. The GUI may also present real-time information associated with compliance of current aircraft performance (i.e., current, actual parameter data) to the applicable subset of the SOPs. The real-time information may include at least one alert or other indication of non-compliance, when applicable.

The local communication device 208 is configured to receive aircraft parameter data associated with a plurality of aircraft onboard systems. In certain embodiments, the local communication device 208 may permit communication directly between the computing device 200 and aircraft onboard systems. However, in other embodiments, the local communication device 208 may collect data associated with the aircraft onboard systems by accessing one or more centralized data repositories, which may include: a Quick Access Recorder (QAR), a Digital Flight Data Recorder (DFDR), a flight data acquisition unit, or the like. The local communication device 208 may be configured to transmit and receive data via a wired connection. For example, the local communication device 208 may maintain physical access (e.g., a wired connection) to a common avionics data communication bus onboard an aircraft, from which the local communication device 208 may extract actual parameter data for each of the aircraft onboard systems. The local communication device 208 may also be configured to transmit and receive data via a centralized data repository wireless connection or a wireless connection to each aircraft onboard system. The local communication device 208 may establish the wireless connection using conventional design concepts, which may include Bluetooth, Wi-Fi, or other wireless communication protocol, such as that described above with regard to the data communication network of FIG. 1.

The external communication device 210 is suitably configured to communicate data between the computing device 200 and one or more remote servers (see, for example, FIG. 1). As described in more detail below, data received by the external communication device 210 may include, without limitation: standard operating procedures (SOPs), safety data, aircraft onboard system limits and/or threshold performance values, and the like. Data provided by the external communication device 210 may include requests for standard operating procedures (SOPs), safety data, aircraft onboard system limits and/or threshold performance values associated with aircraft onboard systems, or the like.

The external communication device 210 may transmit and receive communications over a wireless local area network (WLAN), the Internet, a satellite uplink/downlink, a cellular network, a broadband network, a wide area network, or the like. In certain embodiments, the external communication device 210 is implemented as an onboard aircraft communication or telematics system. In embodiments wherein the external communication device 210 is a telematics module, an internal transceiver may be capable of providing bi-directional mobile phone voice and data communication, implemented as Code Division Multiple Access (CDMA). In some embodiments, other 3G, 4G, and/or 5G technologies may be used to implement the external communication device 210, including without limitation: Universal Mobile Telecommunications System (UMTS) wideband CDMA (W-CDMA), Enhanced Data Rates for GSM Evolution (EDGE), Evolved EDGE, High Speed Packet Access (HSPA), CDMA2000, Evolved High Speed Packet Access (HSPA+), Long Term Evolution (LTE) and/or Long Term Evolution-Advanced (LTE-A).

In certain embodiments, a standard operating procedure (SOP) database, an airline quality database (AQD), and one or more regulatory databases are stored and available at an applicable airline or regulatory office servers. A snapshot of this data will be made by the computing device 200 prior to takeoff or anytime when the database(s) are accessible. Here, the external communication device 210 may obtain the snapshot data via a network (LAN/WAN), over the internet, or via physical memory device (e.g., a disk or a memory card). Alternatively, there could be a direct link to the SOP and AQD databases through internet cloud which can be accessed real-time by the computing device 200.

The data analysis module 212 is configured to analyze actual parameter data associated with the aircraft onboard systems (obtained via the local communication device 208) and the SOP data and safety data associated with each of the aircraft onboard systems (obtained via the external communication device 210). The data analysis module 212 is further configured to determine compliance of the actual parameter data to the SOP data and the safety data, based on comparison and analysis.

The presentation module 214 is configured to operate cooperatively with the user interface 206 to provide a visual representation of current (i.e., real-time) SOP compliance status for each of a plurality of aircraft onboard systems. In certain embodiments, the presentation module 214 displays a graphical user interface (GUI) which may include user-selectable options, menus, icons, and/or other graphical elements appropriate to attract attention of flight crew members and to report compliance data (as determined by the data analysis module 212). The presentation module 214 may be further configured to present safety advisory data determined using safety trends specific to flight crew member actions and recorded actual parameter data. In some embodiments, the presentation module 214 also provides a proactive advisory for viewing by flight crew members to ensure compliance with one or more applicable SOPs.

In practice, the data analysis module 212 and/or the presentation module 214 may be implemented with (or cooperate with) the at least one processor 202 to perform at least some of the functions and operations described in more detail herein. In this regard, the data analysis module 212 and/or the presentation module 214 may be realized as suitably written processing logic, application program code, or the like.

Figure 3:
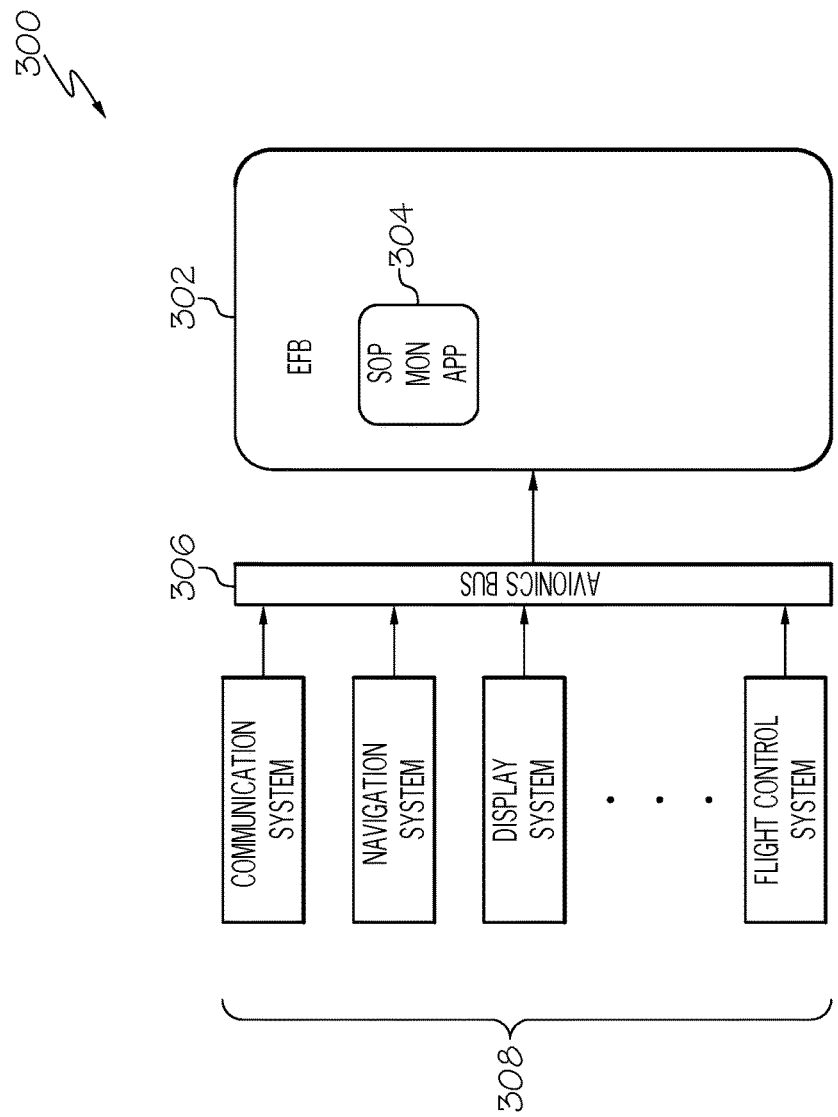
FIG. 3 is a diagram of an exemplary embodiment of an aircraft onboard advisory system, in accordance with the disclosed embodiments.

FIG. 3 is a diagram of one exemplary embodiment of an aircraft onboard advisory system 300, in accordance with the disclosed embodiments. It should be appreciated that FIG. 3 depicts a simplified embodiment of the aircraft onboard advisory system 100 shown in FIG. 1, and that some implementations of the aircraft onboard advisory system 300 may include additional elements or components. As shown, a plurality of aircraft onboard systems 308 provide actual parameter data (i.e., actual status data, actual operation data) to an avionics data communication bus 306, from which a computing device 302 may extract the provided data for further analysis and reporting. In this particular embodiment, the plurality of aircraft onboard systems 308 includes a communication system, a navigation system, a display system, a flight control system, and any other aircraft system which may be in communication with an avionics bus and/or in wireless communication with the computing device 302. However, other embodiments of the present disclosure may include other systems, to include, without limitation: hydraulics systems, electronics systems, and/or any other aircraft system compatible with onboard aircraft communication.

Each of the aircraft onboard systems 308 transmits data which may include, without limitation: (i) Aircraft State Parameters: airspeed, altitude, vertical speed, bank angle, pitch angle, aircraft position, gross weight, fuel on board etc.; (ii) Engine Parameters: N1, N2, EGT, oil temperature, engine vibration, throttle position/lever angle, reverser position, etc.; (iii) Aircraft Configuration: elevator position, aileron position, rudder position, flap/slats position, spoilers position, landing gear position, elevator/aileron/rudder trim position, yaw damper switch, flight control modes, etc.: (iv) Aircraft Autopilot: aircraft flight mode annunciations, current autopilot mode selector, EFIS range and switch positions, etc.; (v) Aircraft Systems Data: Bleed value positions, High Pressure valve positions, Valve pressure, cabin altitude, hydraulic system status, hydraulic quantity indications, APU rpm, APU status, etc.; (vi) Flight Management System (FMS) data: flight plan data, cruise altitude, cost index, forecast temperature/wind, crew entry data including V1, VR, V2, takeoff flaps, flex temperature, cost index, constraints, approach data, etc. Note, the listed aircraft flight data parameters listed are just few examples, and that in certain embodiments of the present disclosure, an onboard data recorder may record thousands of available flight data parameters.

The computing device 302 (see reference 104 in FIG. 1) is implemented using a personal electronic device (e.g., a tablet computer) using an aircraft onboard advisory software application (i.e., an "app"). Here, the computing device 302 obtains the actual parameter data provided to the avionics data communication bus 306 via the aircraft onboard advisory app 304. The aircraft onboard advisory app 304 includes the functionality to: (i) obtain the actual parameter data as described, (ii) obtain SOP data and safety data specific to the particular aircraft and/or specific to a current phase of flight, and to (iii) analyze the actual parameter data and the SOP data and safety data to determine whether current performance of each aircraft onboard system is in compliance with the requirements set forth by the SOP data and safety data.

It should be appreciated that the illustrated aircraft onboard systems 308, computing device 302, and any corresponding logical elements, individually or in combination, are exemplary means for performing a claimed function. Other embodiments of the present disclosure may include a computing device 302 implemented as a computing system onboard the aircraft. Some embodiments may utilize a wireless communication connection between a personal electronic device and each aircraft onboard system, in place of an avionics data communication bus 306.

Figure 4:
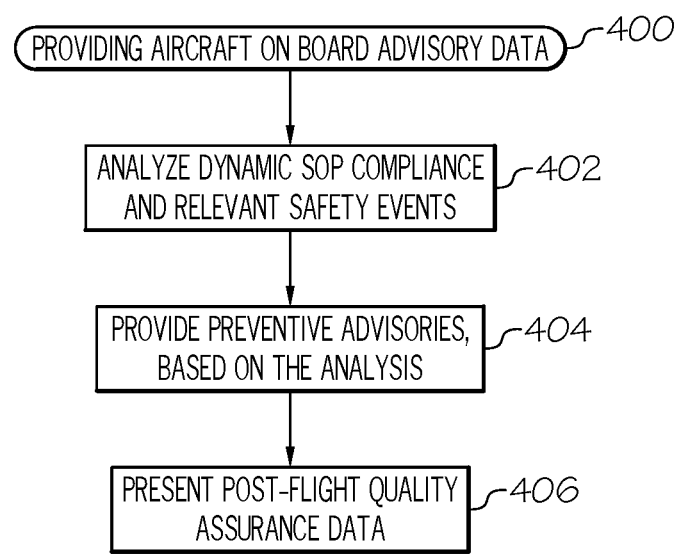
FIG. 4 is a flow chart that illustrates an embodiment of a process for providing aircraft onboard advisory data.

FIG. 4 is a flow chart that illustrates an embodiment of a process 400 for providing aircraft onboard advisory data. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system, e.g., a computing device or a downloadable software application (i.e., an "app"). It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

First, the process 400 analyzes dynamic standard operating procedure (SOP) compliance and relevant safety events (step 402). Here, the process 400 continuously monitors SOP compliance and the occurrence of safety events associated with a current phase of flight. SOP compliance is the adherence of the aircraft to a predefined, step-by-step guide to effectively and safely carry out operations. Relevant safety events may include any safety occurrence associated with a current phase of flight, as defined by information stored in an accessible safety database.

Next, the process 400 provides preventive advisories, based on the analysis (step 404). A preventive advisory is a notification of SOP non-compliance or a safety event applicable to a current phase of flight, presented using graphical elements on an aircraft onboard display and/or Electronic Flight Bag (EFB) display. In some embodiments, a preventive advisory may include potential SOP non-compliance and/or potential safety events which may occur but which have not yet occurred. Preventive advisories provide information for the flight crew so that SOP non-compliance and safety events may be reported and, when possible, avoided. During flight, when the process 400 detects SOP non-compliance, the process 400 may present a non-intrusive notification for SOP non-compliance to avoid distracting the flight crew members. Generally, SOP violations are actions or in-actions that cannot be corrected during the flight, and there may be valid reasons for SOP non-compliance (e.g., ATC command, current atmospheric conditions, etc.).

For example, during a descent briefing, the process 400 obtains information regarding selected airport and runway from a flight management system (FMS), a phase of flight, weather conditions, flight number and schedule, season, bird strike rates and safety trending as identified in the Aviation Quality Database (AQD). When the process 400 has access to the listed aircraft parameter data, the process 400 detects events of a high probability and presents an advisory for viewing via aircraft onboard display or Electronic Flight Bag (EFB) display. Exemplary embodiments of particular advisories may include, without limitation: avoid 250 knots (kts)/10000 Exceedance for Airport X; higher risk of bird strikes for a specific tail number and/or specific airspace; avoid high taxi speed at Taxiway X after landing on Runway Y; avoid long landing on Runway X. In this example, the process 400 provides an advisory to the flight crew based on runtime parameters and AQD data for a higher probability of 250/10000 speed limit exceedance, and a history of high risk of bird strikes during descents in this time and/or season, and for this specific flight number. The advisory is also computed to indicate a higher rate of high taxi speed or long landing events after landing on a particular runway and taxiway entry. The process 400 detects these parameters at runtime and provided as advisory for the crew to consider during the briefing. Here, the process 400 provides an effective defensive mechanism of safety threats as part of the "Swiss Cheese Model" of accidents, mitigates the safety threats through effective safety risk management, and promotes safety awareness.

The process 400 then presents post-flight quality assurance data (step 406). Post-flight quality assurance data may include reporting on SOP compliance/non-compliance, safety events, and associated flight crew action/inaction that occurred during the flight. Post-flight, a review of the whole flight can be performed based on any specific events, or a general check of the quality of flight. Any specific events which need to be reported can be referred to file the ASRs. In certain embodiments, the process 400 derives a historical trend of SOP compliance violations and safety issues occurring over a period of time (e.g., a specified number of flights) and includes them in a post-flight presentation of data. The process 400 may present the data via aircraft onboard display and/or via Electronic Flight Bag (EFB) display.

Although the process 400 presents non-intrusive notifications for SOP non-compliance during the flight, after the flight instances of SOP non-compliance are flagged or otherwise identified along the flight path so that the location of the violation is known. When selected, additional details of the violation (e.g., a graph between the required parameter and the actual data from the flight) are provided. In some embodiments, the process 400 links instances of SOP non-compliance with the Aviation Safety Reporting System (ASRS) report, thereby complying with the typical operational policy to log a report for the non-compliance of the SOP.

Figure 5:
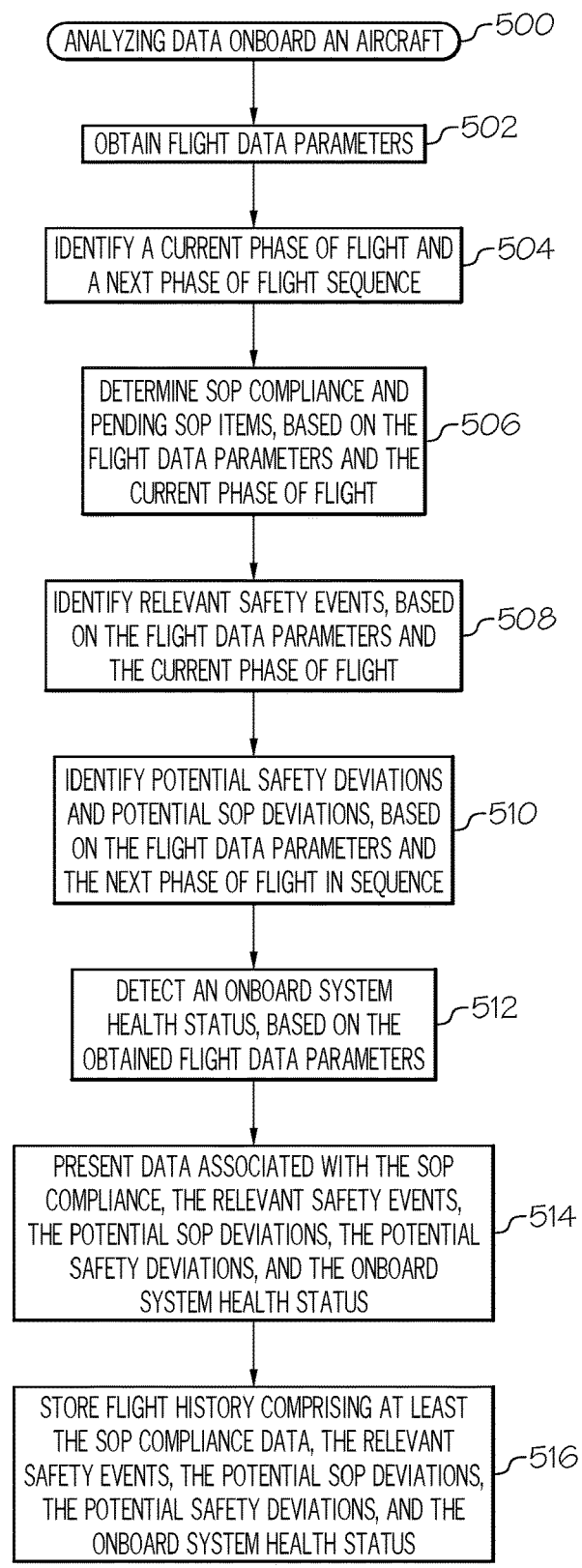
FIG. 5 is a flow chart that illustrates an embodiment of a process for analyzing data onboard an aircraft.

FIG. 5 is a flow chart that illustrates an embodiment of a process 500 for analyzing data onboard an aircraft. For ease of description and clarity, it is assumed that the process 500 begins by obtaining flight data parameters (step 502). Each flight data parameter is associated with one or more aircraft onboard systems. Flight data parameters include settings or operations of an aircraft onboard system, which indicate actions and/or inactions of flight crew members which may comply or not comply with SOPs. Here, the process 500 establishes a communication connection, via a common avionics data bus and/or a wireless communication connection to one or more aircraft onboard systems, and obtains this "actual" status data (i.e., actual aircraft parameter data) provided by the aircraft onboard systems by monitoring the current performance of the aircraft. In certain embodiments, parameter data may be a directly recorded parameter. However, in other embodiments, parameter data may include a pre-defined parameter computed/derived based on a set of recorded parameters and formulae. In some embodiments, recorded parameter data may include systems recorded data (described above) and recorded flight crew voice data. Here, flight crew voice data is recorded during completion of a flight briefing and/or flight checklist procedure, and the process 500 accesses the recorded voice data.

Next, the process 500 identifies a current phase of flight and a next phase of flight in sequence (step 504). A phase of flight is an operational period within a flight, and may include, without limitation: standing (STD), pushback/towing (PBT), taxi (TXI), takeoff (TOF), initial climb (ICL), en route (ENR), maneuvering (MNV), approach (APR), landing (LDG), emergency descent (EMG), uncontrolled descent (UND), post-impact (PIM), and/or various sub-categories of these.

The process 500 then determines SOP compliance and pending SOP items, based on the flight data parameters and the current phase of flight (step 506). One suitable methodology for determining SOP compliance for the aircraft is described below with reference to FIG. 6. In this step, the process 500 compares the detected flight parameter data (i.e., the current performance of onboard systems of the aircraft) with an SOP associated with the aircraft and/or a current phase of flight, and identifies discrepancies between the detected status and the SOP. In certain embodiments, the process 500 identifies aircraft performance for an entire flight and compares this entire-flight performance to a set of standard rules applicable to the aircraft and/or applicable to the entire flight. In some embodiments, the process 500 identifies aircraft performance specific to a particular phase of flight, and then compares this flight-phase-specific performance to a set of rules applicable to the same phase of flight. Discrepancies between the flight parameter data and one or more SOPs indicate non-compliance. In embodiments where the obtained flight data parameters include flight crew voice data recorded during completion of a flight briefing and/or flight checklist procedure, the process 500 may analyze and/or process the recorded voice data based on the particular phase of flight to determine whether any particular item was not completed according to the requirements of the flight briefing or checklist. Such incomplete flight briefing or checklist items indicate non-compliance. Notifications of compliance or non-compliance may be referred to as compliance data.

Each of the SOPs is relevant to, or associated with, a particular phase of flight. To check compliance with the SOPs, several avionics subsystems data may be required. Additionally, information from one or more avionics subsystems may not necessarily indicate compliance/non-compliance, and the process 500 may use the flight parameter data in further computations to determine compliance/non-compliance with each SOP.

One example of an SOP for which the process 500 may determine compliance is a flight controls check SOP. Prior to takeoff, flight control surfaces (e.g., elevator, rudder, aileron) need to be checked to their maximum and minimum values to ensure that each is in working condition. To implement this SOP, the process 500 first needs to know the current state of the flight. This check may be applicable after engine start and before taxi phase. For detection of the state, the following interactions are required: check the engines for status and N1, and check the brakes value to ensure aircraft is after engine start and before taxi phase. Flight control data is continuously monitored for rudder/elevator/aileron values to check the extreme values on both sides. When the state of these controls is noticed to be in both the maximum and minimum position, then the SOP is considered to be complied. When the Taxi flight phase or takeoff flight phase commences, if it happens that any of these controls have not been set to maximum/minimum values, then the SOP item is considered violated and this Event is detected for later Crew analysis along with relevant parameters for the nature of the event.

Additional examples of SOP non-compliance may include: a difference in the Flight Director switch position, a Baro difference between Captain and Flight Officer position, Spoilers Not Armed, Auto Brakes Not set, Landing Runway in Flight Management System (FMS) not selected, Landing Ref Speed Not confirmed, Wind Data Entry Missing, Missed approach altitude not set after G/S capture, Light switch position, or the like.

The process 500 also identifies pending SOP items for the current phase of flight (step 506), based on the obtained flight data parameters and the current phase of flight. Pending SOP items for the current flight phase include actions pending for the current phase only. If actions associated with these pending SOP items for the current flight phase are not performed, and the flight phase transitions to another phase, then the SOP is considered violated and the aircraft is not in compliance with the SOP. This mode alerts the pilot on pending actions for the current phase.

Next, the process 500 identifies relevant safety events, based on the flight data parameters and the current phase of flight (step 508). Relevant safety events may include items from an accessible safety database, a regulatory authority database, and/or any other safety database which stores items and descriptions critical to the safe operation of an aircraft. Relevant safety events may also include potential safety threats associated with one or more particular phases of flight. Data stored in one or more applicable safety database may include general warnings or alerts based on trend of events or violations from historical flights. The process 500 filters this safety data based on the current state of flight, the location, or the conditions, and provides relevant alerts or warnings to the flight crew. For example, a trend of bird strikes in winter for the Airport X between 7-9 am could be an alert in the safety database. If the conditions (landing in winter at Airport X during the period of time from 7-9 am) are met for the current flight, then a warning is given to the pilot. The only relevant action for the pilot is to watch out or follow the speed restrictions strictly based on this warning. Identification of relevant safety events may include: Unstable Approach Check (for which the process 500 presents data in step 512). In certain embodiments, any pending SOP item not followed in a particular flight phase becomes a relevant safety event once the flight phase has ended.

The process 500 then identifies potential SOP deviations and potential safety deviations, based on the flight data parameters and the next phase of flight in sequence (step 510). In addition to compliance and non-compliance with SOPs, the process 500 also provides data regarding potential events of concern to a flight crew onboard an aircraft, including potential SOP deviations and potential safety deviations that may occur during the next phase of flight in sequence. In certain embodiments, these potential deviations may include, without limitation, pending SOP items for the next phase of flight in sequence and/or SOP items for future phases of flight associated with the particular flight. Identification of SOP items for future flight phases (i.e., the next phase of flight in sequence and/or any future phase of flight) provides a notification to the flight crew so that flight crew members may be prepared and familiar with required actions to perform during future flight phases.

In some embodiments, the process 500 may identify potential safety deviations based on trends identified in historic safety data. Here, the process 500 accesses safety trends stored at a safety database, and from the stored safety trends, identifies particular safety events that have frequently occurred for the applicable flight and/or for the applicable destination. In some embodiments, the process 500 may identify potential safety deviations based on recorded flight crew voice data (step 502) and identified relevant safety events (step 508). For example, when a relevant safety event has been identified, the process 500 may further identify a required flight briefing and/or flight checklist that corresponds to the relevant safety event, and then determine whether the required flight briefing and/or flight checklist has been completed. Non-completion may indicate SOP non-compliance (described above with regard to step 506), and in some embodiments, may be identified as a potential safety deviation.

Next, the process 500 identifies an onboard system health status, based on the flight data parameters (step 512). The onboard system health status includes information associated with in-flight and/or post-flight maintenance tasks. For example, the onboard system health status may include an intermittent bleed value failure, a pitch trim fault, or any passive/degraded performance of a system which may not be explicitly indicated via onboard aircraft system display and warning systems.

The process 500 presents data associated with the SOP compliance, the relevant safety events, the potential SOP deviations, the potential safety deviations, and the onboard system health status (step 514). Here, the process 500 displays the identified data using graphical elements presented via an aircraft onboard display and/or Electronic Flight Bag (EFB) display. In some embodiments, the process 500 may present the identified data using graphical elements on a display, in the form of a "preventive advisory" or other notification for a flight crew (described previously with regard to FIG. 4).

In certain embodiments, the process 500 stores the identified data as flight history data comprising at least the SOP compliance data, the relevant safety events, the potential SOP deviations, the potential safety deviations, and the onboard system health status (step 516). This stored data may be used for later documentation (e.g., ASRs (Aviation Safety Reports) or other reporting) and for future analysis of flight data trends. In some embodiments, the process 500 may use secured storage and access of the identified data, to prevent a first flight crew from accessing a second flight crew's flight data. However, it should be appreciated that the process 500 may use any type of storage which may be applicable to flight data storage, which may include secure or un-secure storage, aircraft onboard storage, external flight data storage, and/or any combination of these.

Figure 6:
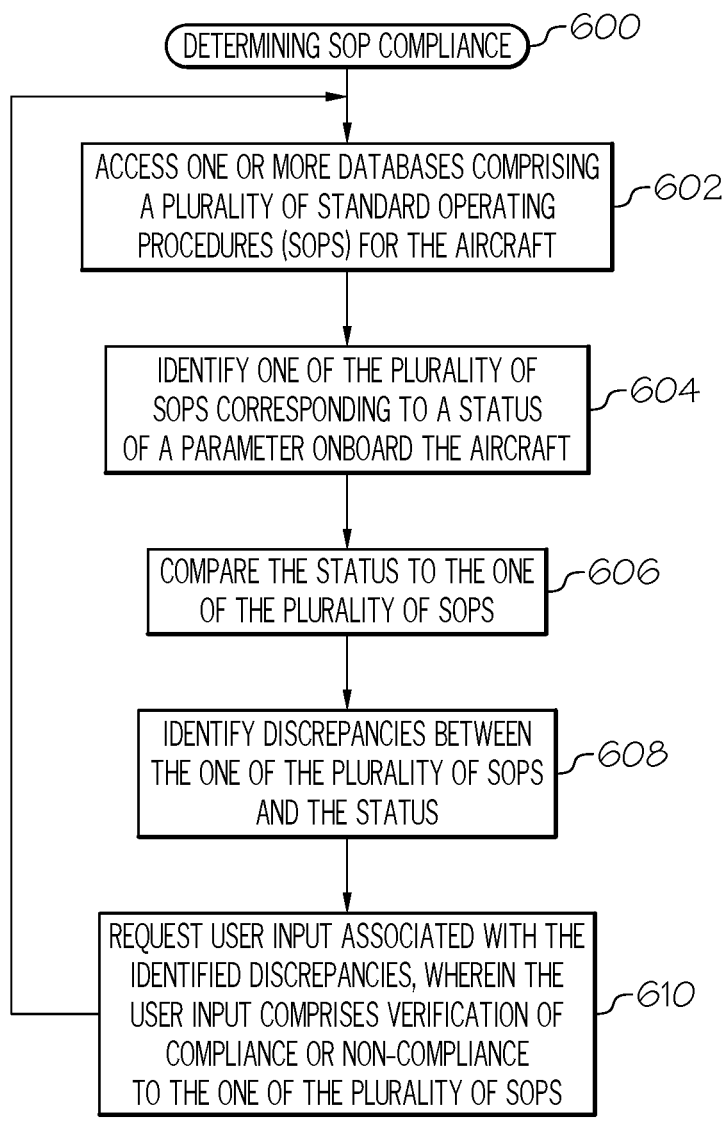
FIG. 6 is a flow chart that illustrates an embodiment of a process for determining whether an aircraft onboard system complies with a standard operating procedure (SOP).

FIG. 6 is a flow chart that illustrates an embodiment of a process 600 for determining whether an aircraft onboard system complies with a standard operating procedure (SOP). It should be appreciated that the process 600 described in FIG. 6 represents one embodiment of step 506 described above in the discussion of FIG. 5, including additional detail. First, the process 600 accesses one or more databases comprising a plurality of standard operating procedures (SOPs) for the aircraft (step 602).

A Standard Operating Procedure (SOP) provides a flight crew with a step by step guide to effectively and safely carry out operations. The SOPs may include rules, either for the entire flight or for a specific phase of the flight, and the SOPs provide limits, appropriate values, and required user input to ensure safe operation and appropriate performance of the aircraft. The one or more databases may include a standard operating procedure (SOP) database, an airline safety database, a regulatory authority database, or any other database or storage location appropriate to SOPs and/or rules.

Next, the process 600 identifies one of the plurality of SOPs corresponding to a status of a parameter onboard the aircraft (step 604). Here, the process 600 may perform a lookup within the appropriate database for particular SOPs corresponding to a particular aircraft onboard system. The process 600 then compares the status to the one of the plurality of SOPs (step 606), and identifies discrepancies between the one of the plurality of SOPs and the status (step 608). A discrepancy between the status of an aircraft onboard system and an SOP associated with that particular aircraft onboard system indicates non-compliance of the aircraft onboard system. When such a discrepancy occurs, user action may be required to bring the status of the aircraft onboard system into compliance with the SOP.

When discrepancies between the one of the plurality of SOPs and the status are identified (step 608), then the process 600 may request user input associated with the identified discrepancies, wherein the user input comprises verification of compliance or non-compliance to the one of the plurality of SOPs (step 610). Because there may be valid reasoning for a flight crew member to be non-compliant with particular SOPs at particular times, the process 600 requests user input for notation of the non-compliant event.

The process 600 is continuous in nature, as indicated by the flowchart. When flight crew members refer to a presented list of identified discrepancies and comply with an SOP item associated with one of the identified discrepancies, the one of the identified discrepancies is removed from the presented list.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for analyzing data onboard an aircraft, the method comprising:
    executing an Electronic Flight Bag (EFB) application, by a computing device communicatively coupled to an avionics data bus onboard the aircraft, wherein the avionics data bus is communicatively coupled to aircraft onboard systems comprising at least navigation systems, display systems, communication systems, and flight control systems;
    obtaining aircraft parameter data from the avionics data bus, by the computing device, wherein the aircraft parameter data comprises at least status data transmitted by the aircraft onboard systems to the avionics data bus;
    identifying a current phase of flight;
    determining standard operating procedure (SOP) compliance onboard the aircraft, based on the aircraft parameter data and the current phase of flight;
    identifying relevant safety events, based on the aircraft parameter data and the current phase of flight; and
    presenting data associated with the SOP compliance and the relevant safety events, by the computing device via the EFB application, wherein the data comprises at least preventive advisories presented in real-time during the current phase of flight and quality assurance data presented post-flight, and wherein the quality assurance data comprises at least SOP compliance data, safety event data, and associated historical trends, after completion of the current phase of flight.

2. The method of claim 1, further comprising:
    identifying a next phase of flight in sequence;
    identifying potential safety deviations and potential SOP deviations, based on the aircraft parameter data and the next phase of flight in sequence; and
    presenting a second set of data associated with the potential safety deviations and the potential SOP deviations.

3. The method of claim 1, further comprising:
    detecting an onboard system health status, based on the aircraft parameter data; and
    presenting a second set of data associated with the onboard system health status.

4. The method of claim 1, wherein determining SOP compliance further comprises:
    identifying a plurality of standard operating procedure (SOP) rules;
    monitoring current performance of the aircraft, wherein the aircraft parameter data comprises the current performance;
    comparing the current performance to the plurality of SOP rules; and determining the SOP compliance, based on comparing the current performance to the plurality of SOP rules.

5. The method of claim 4, further comprising:
accessing a safety database external to the aircraft, wherein the safety database comprises a plurality of safety events; and
filtering the plurality of safety events to identify a subset applicable to the current phase of flight, wherein the current performance is associated with the current phase of flight;
wherein presenting the relevant safety events further comprises presenting the subset.

6. The method of claim 5, further comprising:
identifying a next phase of flight in sequence;
filtering the plurality of safety events to identify a second subset applicable to the next phase of flight in sequence;
wherein presenting the relevant safety events further comprises presenting the second sub set.

7. The method of claim 4, further comprising:
accessing a standard operating procedure (SOP) database; and
obtaining at least a portion of the plurality of SOP rules from the SOP database.

8. A non-transitory, computer-readable medium containing instructions thereon, which, when executed by a processor, perform a method comprising:
executing an Electronic Flight Bag (EFB) application, by the processor communicatively coupled to an avionics data bus onboard an aircraft, wherein the avionics data bus is communicatively coupled to aircraft onboard systems comprising at least navigation systems, display systems, communication systems, and flight control systems;
obtaining aircraft parameter data from the avionics data bus, by the computing device, wherein the aircraft parameter data comprises at least status data transmitted by the aircraft onboard systems to the avionics data bus;
obtaining, by the processor onboard the aircraft, a set of standard operating procedures (SOPs) applicable to a current phase of flight;
generating compliance data based on the set of SOPs and status data for a plurality of systems onboard the aircraft, wherein the status data comprises the aircraft parameter data;
identifying real-time safety data applicable to the current phase of flight;
presenting the compliance data and the real-time safety data, by the processor via the EFB application, wherein the compliance data and the real-time safety data comprise at least preventive advisories presented in real-time during the current phase of flight and quality assurance data presented post-flight, and wherein the quality assurance data comprises at least SOP compliance data, safety event data, and associated historical trends, after completion of the current phase of flight.

9. The non-transitory, computer-readable medium of claim 8, wherein generating the compliance data further comprises:
comparing status data to the set of SOPs; and
identifying discrepancies between the status data and the detected set of SOPs;
wherein the discrepancies indicate non-compliance to the SOPs.

10. The non-transitory, computer-readable medium of claim 8, wherein the method further comprises:
accessing a standard operating procedure database comprising a plurality of standard operating procedures (SOPs);
filtering the plurality of SOPs to identify the set of SOPs applicable to the current phase of flight;
identifying one of the plurality of SOPs corresponding to the status data;
comparing the status data to the one of the plurality of SOPs; and
determining whether the status data complies with the one of the plurality of SOPs, based on the comparing.

11. The non-transitory, computer-readable medium of claim 8, wherein the method further comprises:
accessing a safety database comprising a plurality of safety events;
identifying one of the plurality of safety events corresponding to the current phase of flight;
comparing the status data to the one of the plurality of safety events; and
determining whether the status data indicates required action for the safety event, based on the comparing.

12. The non-transitory, computer-readable medium of claim 8, wherein the method further comprises:
accessing a common avionics data communication bus onboard the aircraft; and
obtaining the status data for a plurality of systems onboard the aircraft via the common avionics data communication bus.

13. The non-transitory, computer-readable medium of claim 8, wherein the method further comprises:
establishing a wireless communication connection to a plurality of aircraft onboard systems; and
obtaining the status data for a plurality of systems onboard the aircraft via the wireless communication connection.

14. A system for analyzing data onboard an aircraft, the system comprising:
a system memory element;
a local communication device communicatively coupled to an avionics data bus onboard the aircraft, wherein the avionics data bus is communicatively coupled to a plurality of aircraft onboard systems comprising at least navigation systems, display systems, communication systems, and flight control systems of the aircraft, the local communication device configured to receive aircraft parameter data from the plurality of aircraft onboard systems, wherein the aircraft parameter data comprises at least status data transmitted by the plurality of aircraft onboard systems to the avionics data bus;
at least one processor, communicatively coupled to the system memory element and the local communication device, the at least one processor configured to:
executing an Electronic Flight Bag (EFB) application;
identify a current phase of flight;
determine standard operating procedure (SOP) compliance onboard the aircraft, based on the aircraft parameter data and the current phase of flight;
identify relevant safety events, based on the aircraft parameter data and the current phase of flight; and
present data associated with the SOP compliance and the relevant safety events via the EFB application, wherein the data comprises at least preventive advisories presented in real-time during the current phase of flight and quality assurance data presented post-flight, and wherein the quality assurance data comprises at least SOP compliance data, safety event data, and associated historical trends, after completion of the current phase of flight.

15. The system of claim 14, wherein the local communication device is further configured to:
   establish a wireless communication connection with the plurality of aircraft onboard systems; and
   obtain the aircraft parameter data via the wireless communication connection.

16. The system of claim 14, wherein the local communication device is further configured to:
   establish a communication connection to an avionics data bus communicatively coupled to the plurality of aircraft onboard systems; and
   extract the aircraft parameter data from the avionics data bus.

17. The system of claim 14, further comprising:
   an external communication device situated onboard the aircraft and communicatively coupled to the at least one processor and a remote server external to the aircraft, wherein the external communication device is configured to receive, from the remote server, SOP data applicable to the aircraft;
   wherein the at least one processor is further configured to determine the SOP compliance by identifying discrepancies between the aircraft parameter data and the SOP data.

18. The system of claim 14, wherein the system memory element is configured to store SOP data;
   wherein the at least one processor is further configured to:
      receive the SOP data from the system memory element; and
      determine the SOP compliance by identifying discrepancies between the aircraft parameter data and the SOP data.

19. The system of claim 14, wherein the at least one processor is further configured to:
   identify a subset of SOP data applicable to a current phase of flight; and
   compare current aircraft performance to the subset of SOP data, wherein the aircraft parameter data comprises the current aircraft performance; and
   wherein the system further comprises:
      a graphical user interface communicatively coupled to the at least one processor, wherein the graphical user interface is configured to display the subset of SOP data applicable to the current phase of flight and real-time information associated with compliance of the current aircraft performance to the subset of SOP data, and wherein the real-time information comprises at least one alert.

20. The non-transitory, computer-readable medium of claim 8, wherein the method further comprises:
   storing the compliance data and the real-time safety data in a flight history database, wherein the flight history database further comprises historical compliance data and historical safety data;
   analyzing the compliance data, the real-time safety data, the historical compliance data, and the historical safety data to identify trends; and
   presenting a visual representation of the trends.

* * * * *